United States Patent [19]

Ito et al.

[11] Patent Number: 4,750,816
[45] Date of Patent: Jun. 14, 1988

[54] ELECTROCHROMIC ELEMENT COMPRISING AN ORGANIC, OXIDATIVE COLOR-FORMING LAYER AND AN INORGANIC, REDUCTIVE COLOR-FORMING LAYER

[75] Inventors: Toshiyasu Ito; Taskaaki Mori; Jun Minoura; Katsuaki Okabayashi; Shigeyuki Takahashi; Mamoru Kato, all of Aichi, Japan

[73] Assignees: Toyoda Gosei Co., Ltd., Nishikasugai; Kabushiki Kaisha Toyota Chuo Kenkyusho, Aichi, both of Japan

[21] Appl. No.: 858,033

[22] Filed: May 1, 1986

[30] Foreign Application Priority Data

May 1, 1985 [JP] Japan .................................. 60-94640
Mar. 10, 1986 [JP] Japan .................................. 61-52985
Mar. 10, 1986 [JP] Japan .................................. 61-52986

[51] Int. Cl.$^4$ .............................................. G02F 1/01
[52] U.S. Cl. .................................................. 350/357
[58] Field of Search ........................................ 350/357

[56] References Cited

U.S. PATENT DOCUMENTS

| | | | |
|---|---|---|---|
| 4,182,551 | 1/1980 | Washida et al. | 350/357 |
| 4,192,581 | 3/1980 | Yaguchi et al. | 350/357 |
| 4,239,350 | 12/1980 | Morita et al. | 350/357 |
| 4,350,414 | 9/1982 | Takahashi et al. | 350/357 |
| 4,482,216 | 11/1984 | Hashimoto et al. | 350/357 |
| 4,645,307 | 2/1987 | Miyamoto et al. | 350/357 |

FOREIGN PATENT DOCUMENTS

| | | | |
|---|---|---|---|
| 0027855 | 5/1981 | European Pat. Off. | |
| 0189601 | 8/1986 | European Pat. Off. | |
| 2854812 | 12/1979 | Fed. Rep. of Germany | |
| 3008768 | 9/1981 | Fed. Rep. of Germany | |
| 3615379 | 11/1986 | Fed. Rep. of Germany | |
| 0037622 | 3/1983 | Japan | 350/357 |
| 0184129 | 10/1985 | Japan | 350/357 |
| 0263922 | 12/1985 | Japan | 350/357 |
| 2021277 | 11/1979 | United Kingdom | 350/357 |

*Primary Examiner*—Gene Wan
*Assistant Examiner*—James C. Lee
*Attorney, Agent, or Firm*—Cushman, Darby & Cushman

[57] ABSTRACT

There is disclosed an electrochromic element in which an oxidative color-forming layer is composed of an organic material and a reductive color-forming layer is composed of an inorganic material. The electrochromic element comprises a pair of electrodes, at least one of which is transparent, the oxidative color-forming layer composed of organic materials such as polyaniline, polypyrrole, polythiophene, etc. and the reductive color-forming layer composed of inorganic materials such as $WO_3$, $MoO_3$, $TiO_2$, etc. formed between the pair of electrodes to face to each other, and an electrolytic solution or a solid or semi-solid electrolyte layer sealed between the both color-forming layers.

6 Claims, 4 Drawing Sheets

ELECTROCHROMIC ELEMENT COMPRISING AN ORGANIC, OXIDATIVE COLOR-FORMING LAYER AND AN INORGANIC, REDUCTIVE COLOR-FORMING LAYER

BACKGROUND OF THE INVENTION

1. FIELD OF THE INVENTION

The present invention relates to electrochromic elements as well as various dimmers and display devices using the same.

2. DESCRIPTION OF THE RELATED ART

Electrochromic elements (hereafter simply referred to as EC) that reversibly vary color or extinction coefficient thereof by inducing an electrochemical reaction in the elements through external application of voltage possess many characteristics that are not found with solid light emitting diode (LED) or liquid crystal display (LCD). For these reasons, it has gone forward to put ECDs to practical use as dimmer elements or elements for display in various fields of industry including electronic industry.

As techniques relating to the present invention, there are inorganic ECs using transition metal oxides or organic EC using electroconductive organic polymer or viologen derivatives, etc.

A basic construction of the aforesaid inorganic ECs composed of transition metal oxides is a laminate comprising a pair of electrodes composed to ITO ($In_2O_3$ containing 5 wt % of $SnO_2$), etc. in a thin, transparent layer, having laminated therebetween a color-forming layer comprising various transition metal oxides and further thereon a dielectric layer (or a solid electrolyte) in thin layers.

These inorganic ECS enable elements possess advantages that enable elements to miniaturize, form into thin layers, render durable, stably operate over long periods of time, etc. On the other hand, however, disadvantages are pointed out that change between coloring and decoloring is poor when voltage is applied and response is also questionable.

This is because oxidatively color-forming materials suitable as opposing electrodes of reductive color-forming layers comprising $WO_3$, etc. are not found in inorganic materials.

On the other hand, a basic construction of organic EC is a laminate comprising a pair of thin layered, transparent electrodes composed of the foregoing ITO, etc. having laminated therebetween a conductive polymer such as polyaniline, polypyrrole, polythiophene, etc. or viologen derivatives., or a cell having sealed them together with electrolytic solutions.

These organic ECs exhibit superior responsibility to inorganic ECs but the durability of the elements comes into a problem; it is pointed out that stable operation over long periods of time is still uncertain. This is because excellent reductive color-forming materials are not found in organic materials.

As above, ECs of both types involve advantages and disadvantages, respectively, and it is the actual situation that any of ECs does not satisfactorily exhibit their properties intrinsic to ECs.

In recent years, a sunroof has been extensively mounted for purposes of making the inside of a car an open atmosphere and controling lightness of the inside.

Figure 4:
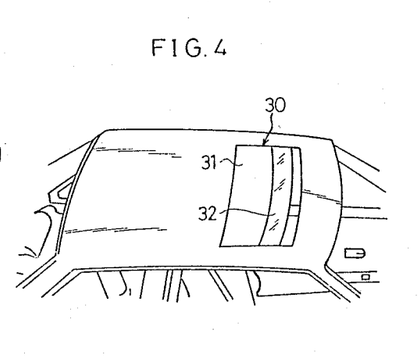
FIG. 4 is a perspective view showing a sunroof in the art related to the present invention.

As shown in FIG. 4, sunroof 30 in the art related to the present invention comprises roof part 31 made of a steel plate and glass part 32 and is designed to control a quantity of incident light into the inside of a car by moving roof part 31 manually or by driving with a motor. Aside from this sunroof 30, there is known a sunroof of type that reduces a quantity of incident light into the inside by printing mesh patterns on the glass part.

Even in either case of manual operation or driving with a motor, however, the operation of the above-described sunroof 30 is complicated because the quantity of incident light must be controlled viewingly.

Further in the case of the mesh type sunroof, a problem encounters that the quantity of incident light cannot be increased or decreased.

Next, a room mirror of a car is equipped with an antiglare mechamism.

Figures 6, 7, 8, 9, 10:
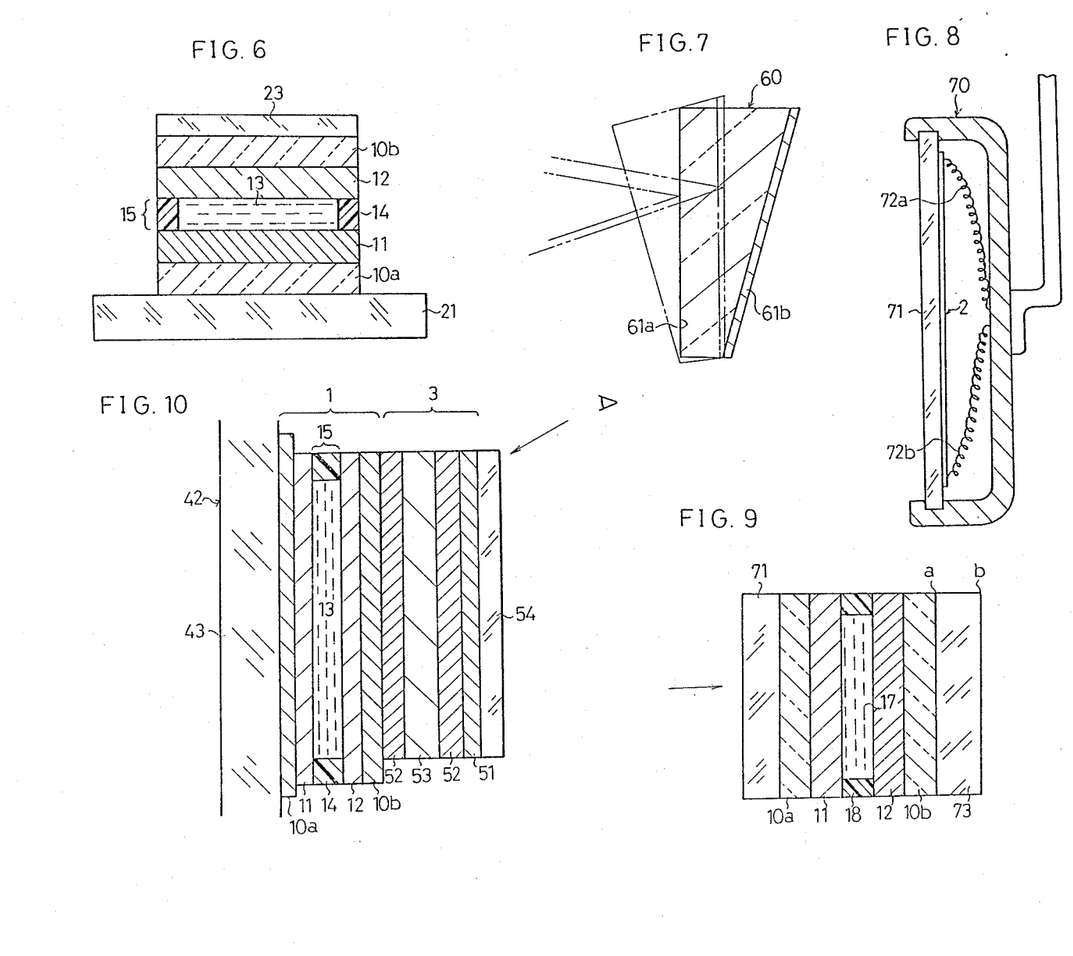
FIG. 6 is a schematically sectional view of the EC used for a sunroof having the dimmer function.
FIG. 8 is a cross sectional view of the main part of the glare-free mirror of the present invention.
FIG. 9 is a schematically sectional view of the EC used for this glare-free mirror.
FIG. 7 is a cross sectional view showing the main part of a room mirror in the art related to the present invention.
FIG. 10 is a schematically sectional view of a display device for an automobile according to the present invention.

As shown in FIG. 7, the antiglare mechanism of room mirror 60 in the art related to the present invention utilizes a prism mirror, which comprises two mirror surfaces 61a and 61b having reflectances different from each other and designed to prevent dazzling of the driver due to reflection of a headlight coming from a car which follows in the night, by hanging the reflection angle. Further aside from the room mirror 60, there has been proposed a mirror capable of changing reflectance in the mirror surface utilizing changes in extinction of light by liquid crystals, also called liquid crystal mirror.

However, the room mirror 60 in the art relates to the present invention encounters a problem that the rear visibility is reduced upon glare shielding, although the room mirror provides a satisfactory antiglare effect.

On the other hand, in the case of the liquid crystal mirror, liquid crystals are largely dependent upon the angle of view, and therefore, a problem encounters that a satisfactory rear visibility is obtained only with difficulty.

Next, an instrument panel equipped with a tachometer, a speedometer, a hazard lamp, etc. is mounted in the front of a driver's seat of a car.

However, the instrument pannel is located considerably down to the driver's eyes in driving a car so that it is troublesome that the driver must turn his eyes down whenever he intends to confirm informations displayed thereon.

SUMMARY OF THE INVENTION

An object of the present invention is to provide novel and useful ECs which are characterized by excellent responsibility and marked change between coloring and decoloring because a color density is high when a voltage is applied.

Another object of the present invention is to provide a sunroof which can readily and greatly change lightness of the inside of a car by a simple operation, using the aforesaid ECs.

A further object of the present invention is to provide glare-free mirrors using the aforesaid ECs that are well balanced between the antiglare effect and visual recognition of the back.

A still further object of the present invention is to provide display devices equipped with the aforesaid ECs at a front glass of a car, whereby a driver can confirm various informations without significantly turning his eyes to the front off.

To achieve these objects, there is constructed an electrochromic element, in a first viewpoint of the present invention, comprising a pair of electrodes, at least one of which is transparent, an organic, oxidative color-forming layer having formed between the pair of electrodes an inorganic, reductive color-forming layer faced to each other and an electrolytic solution sealed between the aforesaid both color-forming layers.

In a second viewpoint of the present invention, there is constructed an electrochromic element comprising a pair of electrodes, at least one of which is transparent, having formed between the pair of electrodes an organic, oxidative color-forming layer and an inorganic, reductive color-forming layer faced to each other and further a solid or semi-solid electrolytic layer formed between the both color-forming layers.

These and other objects of the present invention will be apparent from embodiments later described and claims appended. Many advantages which are not mentioned in the specification will be obvious to one skilled in the art when he practices the present invention.

DETAILED DESCRIPTION OF THE PREFERRED EMBODIMENTS:

(Electrochromic Element)

Hereafter the construction of the EC in accordance with the present invention will be described in detail.

Figure 1:
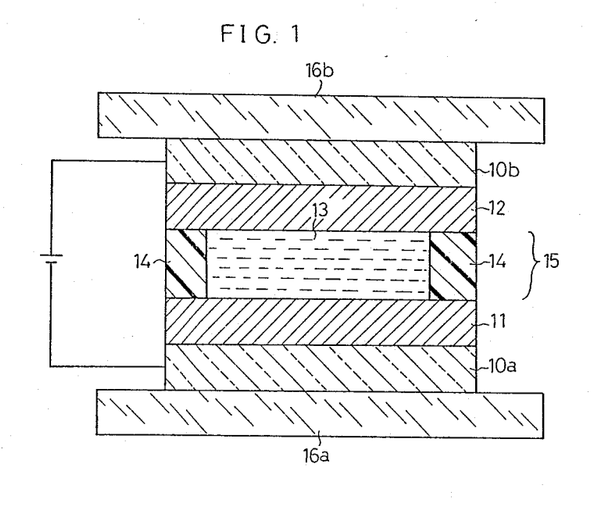
FIG. 1 is a schematically sectional view showing a construction of the EC of the present invention.

FIG. 1 shows a basic construction of the EC of the present invention in which an inorganic, reductive color-forming layer 11 and an organic, oxidative color-forming layer 12 are formed on the surface of a thin layer composed of a pair of a lower electrode 10a and an upper electrode 10b faced to each other and an electrolytic solution layer 15 having sealed an electrolytic solution 13 therein is formed between the electrodes with a spacer 14.

Further the lower electrode 10a and the upper electrode 10b described above are formed on the surface of transparent glass 16a, 16b generally used as substrates by methods of forming a thin layer such as an ion plating method, a sputtering method, etc.

The aforesaid inorganic, reductive color-forming layer 11 is composed of transition metal oxides such as $WO_3$, $MoO_3$, $TiO_2$ etc. or a mixture thereof and specifically one formed on the surface of the aforesaid lower electrode 10a by an EB (electron beam) evaporation method, an ion plating method, a sputtering method, etc.

Further the inorganic, reductive color-forming layer 11 causes a reversible color-forming reaction at the interface with the electrolytic solution 13 due to a doping/undoping reaction of cation M+ (wherein M+ represents $H^+$, $Li^+$, etc.) in the electrolytic solution 13. As an example, in case that $WO_3$ is employed, it is assumed that the following reaction would be caused:

$$WO_3 + XM^+ + Xe^- = M_xWO_3$$

On the other hand, the organic, oxidative color-forming layer 12 described above is specifically formed into a thin layer on the surface of the upper electrode 10b, by subjecting electrochromic materials such as polyaniline, polypyrrole, poly-N-alkylpyrroles, polythiophene, poly-3-alkylthiophenes, etc. to electropolymerization, catalytic polymerization, etc.; from viewpoints of layer forming ability and conductivity, it is preferred to adopt electropolymerization. The reversible color-forming reaction is caused by addition and elimination of proton at the interface with the electrolytic solution 13 in case that the aforesaid polyaniline is used as the electrochromic material and an acidic aqueous solution is used as the electrolytic solution 13 and, in the case of using other organic electrochromic materials, by doping/undoping of anions in the electrolytic solution 13, respectively.

Next, the electrolytic solution 13 described above refers to a solution of an electrolyte in a solvent; the solvent refers to water and/or a polar organic solvent. In view of voltage resistance property, the organic solvent is more preferred than water.

Examples of the organic solvent described above include propylene carbonate, sulforane, acetonitrile, benzonitrile, nitrobenzene, nitromethane and dimethoxyethane.

Examples of the electrolyte described above include inorganic acids such as $HCl$, $H_2SO_4$, $HNO_3$, $HClO_4$, etc.; salts of metals such as $HClO_4$, $HBF_4$ or $HPF_6$, etc. (e.g., $LiClO_4$, $LiBF_4$, $LiPF_6$); and quaternary ammonium salts such as $(C_2H_5)_4NClO_4$, $(CH_3)_4NBF_4$, etc. These electrolytic solutions 13 can also be used by immersing in water-absorbable resins such as cellulose, ion exchange membrane, etc.

Figure 2:
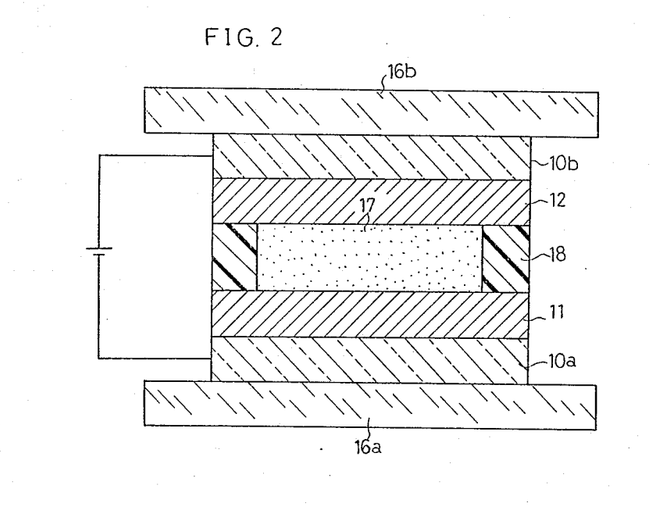
FIG. 2 is a schematically sectional view showing another construction of the EC of the present invention.

Next, FIG. 2 shows another basic construction of the EC of the present invention. This EC is different from the above-described EC only in that a solid or semi-solid electrolytic layer is used in place of the electrolytic solution 13 of the EC described above.

Namely, the inorganic, reductive color-forming layer 11 and the organic, oxidative color-forming layer 12 are formed on the surface of a thin layer composed of a pair of the lower electrode 10a and the upper electrode 10b faced to each other. Further an electrolytic layer 17 comprising a melt mixture of an organic polymer and an electrolyte is formed between these color-forming layers 11 and 12, and surrounded and sealed by an epoxy resin 18 therearound.

Examples of the organic polymer described above include cellulose acetate, polyethylene oxide, polyvinyl acetate, polyvinyl butyral and polyvinylidene fluoride, etc.

Further the electrolyte refers to a solution of the aforesaid metal salt of $HClO_4$, $HBF_4$ or $HPF_6$; e.g., $LiClO_4$, $LiBF_4$, $LiPF_6$, etc. in a polar organic solvent such as propylene carbonate, sulforane, acetonitrile, benzonitrile, nitrobenzene, nitromethane, dimethoxyethane, etc.

The electrolytic layer 17 is obtained by mixing the aforesaid organic polymer with the electrolyte and then melting the mixture by heating at temperatures of about 50° to about 100° C.

Further, the lower electrode 10a, the upper electrode 10b, the inorganic, reductive color-forming layer 11 and the organic, oxidative color-forming layer 12 are all composed of materials similar to those described above. The electrochemical reaction is also caused at the interface between the electrolytic layer 17 and the inorganic, reductive color-forming layer 11 and at the interface between the electrolytic layer 17 and the organic, oxidative color-forming layer 12 based on a similar mechanism.

Hereafter, the examples embodying the present invention will be described with reference to the process for production thereof.

EXAMPLE 1

(a) Inorganic Reductive Color-Forming Layer

The chamber was evacuated to a base pressure of $1\times10^{-5}$ Torr before the introduction of the atmospheric gas. Oxygen gas was introduced to reach the partial pressure of $2.5\times10^{-4}$ Torr. Subsequently algon gas was introduced to make the total pressure of $5\times10^{-4}$ Torr in the device.

Then discharging with a discharge output of 100 W using RF (radio frequency) of 13.56 MHz, an ITO thin layer having a layer thickness of 2000 Å was formed onto a soda-lime glass substrate having a thickness of mm heated at 200° C., by the ion plating method through evaporating an ITO tablet with an EB gun. Subsequently, the inside of the chamber was changed to a nitrogen gas atmosphere of $1\times10^{-3}$ Torr and, a $WO_3$ thin layer having a layer thickness of 6000 Å was formed on the ITO thin layer described above, by the EB deposition method through evaporation of a $WO_3$ tablet with an EB gun.

(b) Organic Oxidative Color-Forming Layer

An aqueous solution of 1.0 N $HClO_4$ was mixed with an aqueous solution of aniline hydrochloride crystalline powders having a 1.0 mole concentration in an equimolar ratio to prepare an electrolytic solution. Then, an ITO thin layer having a layer thickness of 2000 Å was formed into a soda-lime glass substrate in a manner similar to (a) described above. Using the ITO coated glass as an anode and a carbon plate as a cathode, a green to navy blue polyaniline layer having a layer thickness of 4000 Å was formed on the color-forming layer at the anode, by the electropolymerization method in which both electrodes were immersed in the above-described electrolytic solution and a current was applied at room temperature.

It is preferred that a synthetic current display upon the aforesaid electropolymerization will be in a range of 10 $\mu A$ to 5 $mA/cm^2$, more peferably 50 $\mu A$ to 1 $mA/cm^2$. With the synthetic current density of less than 10 $\mu A/cm^2$, a rate of forming a layer is slow and with greater than 5 $mA/cm^2$, there is a fear that the formed thin layer might be finely divided into powders to deteriorate the efficiency. Further the layer thickness of the polyaniline layer can be controlled in a range of 500 Å to 2 $\mu m$ by varying the synthetic current display described above but generally in a range of 2000 to 4000 Å. In view of preventing deterioration of the element due to generation of gas, etc., it is necessary to control the layer thickness so as to smoothly proceed the complementary oxidative-reductive reaction to the inorganic, reductive color-forming layer described above.

Further, inorganic acids such as HCl, $H_2SO_4$, $HNO_3$, etc. may also be used in a range of a 0.1 to 5 normal concentration as the electrolyte in the aforesaid electrolytic solution, in place of $HClO_4$. Furthermore, polyaniline may also be precipitated using an aqueous aniline sulfate solution of a 0.1 to 2 molar concentration, in place of the aqueous aniline hydrochloride solution. Alternatively, polyaniline may be precipitated using an electrolytic solution obtained by dissolving a 0.1 to 2 molar concentration of aniline in these inorganic acid aqueous solutions.

(c) Electrolytic Solution Layer

Both color-forming layers obtained in (a) and (b) above were faced to each other and a spacer composed of a silicone resin was provided therebetween. An electrolytic solution comprising a 0.1N $HClO_4$ aqueous solution was poured therein, which was sealed with epoxy resin.

For this electrolytic solution, inorganic acids such as HCl, $H_2SO_4$, $HNO_3$, etc. exemplified as electrolytes in the electrolytic solutions but in any case, it is preferred that the concentration be in a range of a 0.05 to 1 normal. With the concentration of less than 0.05 normal, decrease in response was observed.

(d) Next, a lead wire was connected to each of the pair of ITO electrodes described above to prepare EC.

A direct current voltage (V) was applied to the thus obtained EC. Change in optical density ($\Delta O.D.$) in response to the change of the voltage applied was measured to obtain the results shown in FIG. 13. On the other hand, $\Delta O.D.$ values were measured with EC comprising a color-forming layer composed of $WO_3$ or polyaniline singly and with whole solid EC in which both color-forming layers comprised of $WO_3/NiOx$. As shown in the figure, it was made clear that ECD of this example had an extremely large $\Delta O.D.$ and a great change in contrast.

Figure 14:
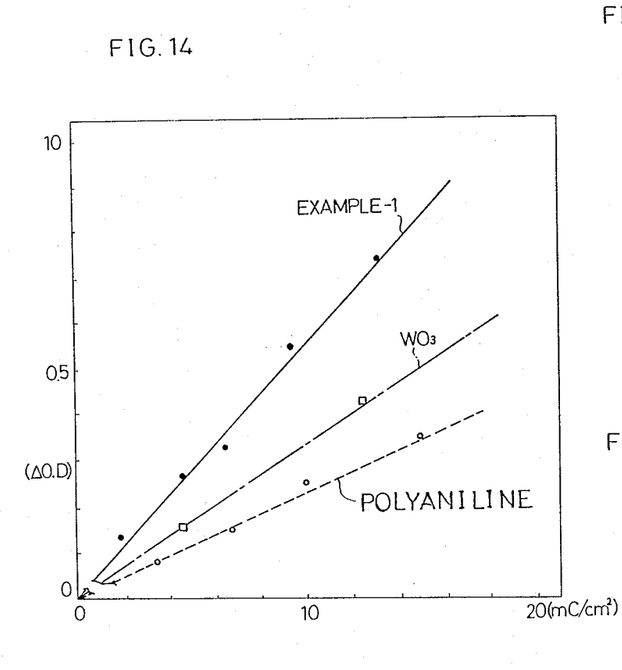

Further, $\Delta O.D.$ values were measured in response to the injected charge ($mC/cm^2$) applied to obtain the results shown in FIG. 14. Changes in $\Delta O.D.$ of polyaniline and $WO_3$ per unit coulomb ($mC/cm^2$) were 0.024 $mC/cm^2$ and 0.033 $mC/cm^2$, respectively, whereas in EC of this example, the change was 0.056 $mC/cm^2$ and, it was clear that a great change in contrast was obtained in an equal electric consumption quantity with the example.

EXAMPLE 2

(a) Inorganic Reductive Color-Forming Layer

An ITO thin layer having a layer thickness of 2000 Å was formed on a soda-lime glass substrate and a $WO_3$ thin layer having a layer thickness of 4000 Å was further formed on the ITO thin layer, in a manner similar to EXAMPLE 1 above.

(b) Organic Oxidative Color-Forming Layer

An electrolytic solution composed of a propylene carbonate solution containing pyrrole and $LiClO_4$. each in a 0.2 molar concentration was prepared. Then, an ITO thin layer was formed on a soda-lime glass substrate in a manner similar to (a) described above. The ITO coated glass was used as an anode and a carbon plate as a cathode. After immersing them in the aforesaid electrolytic solution, a current was applied between the electrodes at room temperature to form a polypyrrole thin layer having a layer thickness of 4000 Å on the ITO coated glass on the anode side.

(c) Electrolytic Solution Layer

Both color-forming layers obtained in (a) and (b) above were faced to each other and a spacer composed of silicone resin was provided therebetween. An electrolytic solution composed of a IM $LiClO_4$-propylene carbonate solution was poured therein, which was then sealed.

Figure 15:
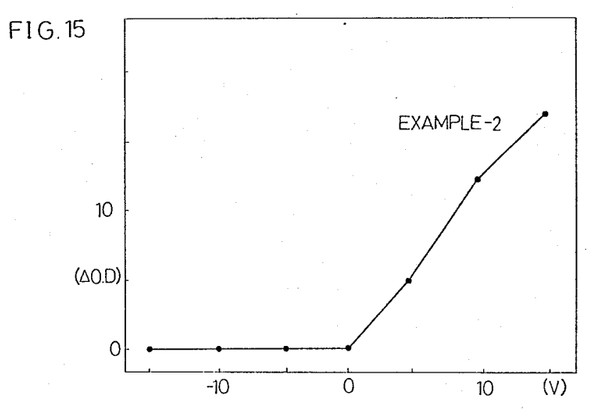

(d) A lead wire was connected to each of the ITO electrodes of the aforesaid color-forming layers to prepare EC. FIG. 15 shows $\Delta O.D.$ of EC of this example. As shown in the figure, the change in contrast was extremely large as in EC of EXAMPLE 1.

EXAMPLE 3

(a) Inorganic Reductive Color-Forming Layer

An ITO thin layer having a layer thickness of 2000 Å was formed on a soda-lime glass substrate and a $WO_3$ thin layer having a thickness of 6000 Å was further formed on the ITO thin layer, in a manner similar to EXAMPLE 1 described above.

(b) Organic Oxidative Color-Forming Layer

A polythiophene thin layer having a layer thickness of 3000 Å was formed on the ITO thin layer at the anode side using an electrolytic solution composed of a nitrobenzene solution containing a 0.5 molar concentration of thiophene and 0.2N $AgClO_4$, in the aforesaid manner.

(c) Electrolytic Solution Layer

Both color-forming layers obtained in (a) and (b) described above were faced to each other and a spacer composed of silicone resin was provided therebetween. The same electrolytic solution as used in EXAMPLE 2 described above was poured therein, which was then sealed with epoxy resin.

(d) A lead wire was connected to each of the ITO electrodes of the aforesaid color-forming layers to prepare EC.

Figure 16:
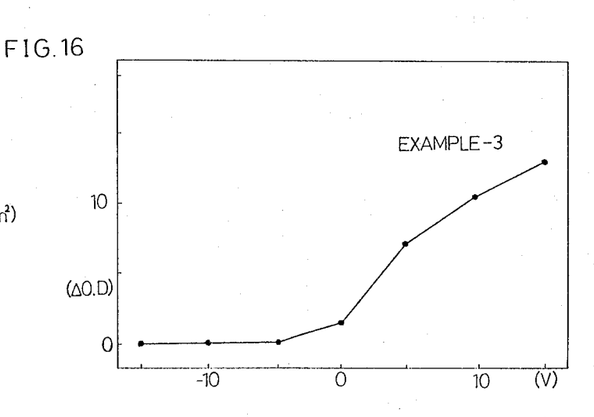

FIG. 16 indicates $\Delta O.D.$ of EC of this example. As shown in the figure, the change in contrast was extremely large as in ECs of EXAMPLE 1 and EXAMPLE 2.

EXAMPLE 4

(a) Inorganic Reductive Color-Forming Layer

An ITO thin layer having a layer thickness of 2000 Å was formed on a soda-lime glass substrate and a $WO_3$ thin layer having a thickness of 6000 Å was further formed on the ITO coated glass, in a manner similar to EXAMPLE 1 described above.

(b) Organic Oxidative Color-Forming Layer

An electrolytic solution was prepared by mixing an aqueous solution of 1N $HClO_4$ and an aqueous solution of aniline hydrochloride crystalline powders having a 1.0 M concentration in an equimolar ratio. Then, an ITO thin layer having a layer thickness of 2000 Å was formed on a soda-lime glass substrate in a manner similar to (a) described above. The ITO coated glass was used as an anode and a carbon plate as a cathode. By the electrolytic polymerization method in which both electrodes were immersed in the aforesaid electrolytic solution and a current was applied at room temperature, a green to navy blue polyaniline layer having a layer thickness of 4000 Å was formed on the ITO coated glass at the anode side.

(c) Electrolyte Layer

As an organic polymer, cellulose acetate was used. Further as an electrolyte, $LiBF_4$ was used. A mixture of 1 part by weight of cellulose acetate and 5.5 parts by weight of propylyene carbonate containing a 1 molar concentration of $LiBF_4$ was heated at 50° to 100° C. to prepare a melt mixture.

Next, this semi-solid melt mixture was coated onto the surface of the $WO_3$ thin layer described above. Thereafter, a soda-lime glass substrate having laminated thereon the aforesaid polyaniline coated ITO electrodes was pressed on the surface of the melt mixture, which was surrounded and sealed with epoxy resin therearound.

(d) A lead wire was connected to each of the ITO electrodes of the color-forming layers to prepare EC A direct current voltage was applied to the thus obtained EC and $\Delta O.D.$ value was measured in response to the change of the voltage applied. As a result, the change in contrast was extremely large as in ECs obtained in EXAMPLES 1 to 3 described above.

Further the EC of this example has an additional advantage that there is not fear of leakage of liquid because the electrolyte layer is constructed with the solid or semi-solid material. The EC of this example is superior to the ECs of EXAMPLES 1 to 3 described above in view of reliance.

The ECs of the present invention are not limited to the structures disclosed in EXAMPLES 1 to 4 described above but may also be embodied as follows, without departing from the gist of the present invention.

(1) Other transition metal oxides such as $MoO_3$, $TiO_2$, etc. may be used to form a reductive color-forming layer, in place of $WO_3$. Further, for formation of the reductive color-forming layer, another type of ion plating method, a sputtering method, a vacuum evaporation method, etc. may be adopted.

(2) The oxidative color-forming layer may also be formed using organic electrochromic materials such as poly-N-alkylpyrroles, polythiophene, poly-3-alkylthiophenes, etc.

(3) One of the opposing electrodes may be composed of transparent materials such as $TiO_2$, $SnO_2$, etc. or opaque materials such as Au, Ag, Pt, etc.

(4) In case that an electrolyte layer composed of a solid or semi-solid electrochromic materials is adopted, polyethylene oxide, polyvinyl acetate, polyvinyl butyral or polyvinylidene fluoride may also be used as the organic polymer.

Further, a solution of $LiClO_4$, $LiPF_6$, or the like dissolved in a polar organic solvent such as sulforane, acetonitrile, benzonitrile, nitrobenzene, nitromethane, dimethoxyethane, or the like may also be used as the electrolyte.

(Sunroof Having Dimmer Function)

Next, the present invention will be described with reference to the examples embodied in sunroof having a dimmer function.

EXAMPLE 5

Figure 3:
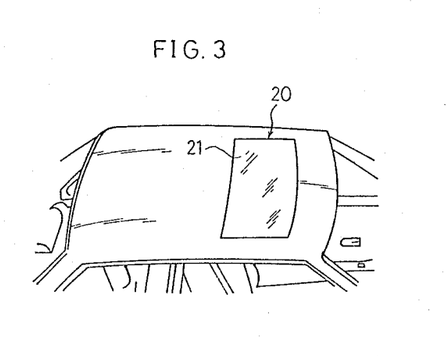
FIG. 3 is a perspective view of a portion mounted with the sunroof having a dimmer function of the present invention.
Figure 5:
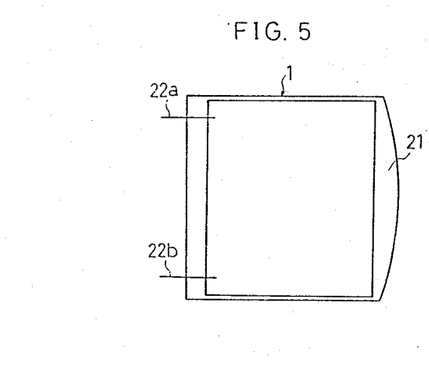
FIG. 5 is a plane view of the main part thereof.

As described above, a sunroof is mounted to the roof part of an automobile for purposes of giving an opendoor atmosphere or controlling brightness of the inside of a car. As shown in FIGS. 3 and 5, the main part of sunroof with a dimmer function comprises transparent glass 21 and EC 1 formed on the surface of the transparent glass 21 as a substrate.

Both electrodes of the EC 1 are connected to battery sources via lead wires 22a, 22b, respectively.

Further as shown in FIG. 6, the EC 1 is constructed by laminating, on the surface of transparent glass 21 for sunroof as a substrate, in sequence, ITO lower electrode 10a, inorganic, reductive color-forming layer 11, electrolytic solution layer 15 comprising spacer 14 and electrolytic solution layer 15 sealed therein, organic, oxidative color-forming layer 12, ITO upper electrode 10b and transparent cover glass 23.

The EC 1 of this example is obtained using the same electrochromic material disclosed in EXAMPLE 1 described above, in a manner similar to EXAMPLE 1.

Namely, transparent glass 21 for sunroof comprises soda-lime glass having a layer thickness of 6 mm as a substrate having formed thereon lower electrode 10a composed of an ITO thin layer having a layer thickness of 2000 Å by the ion plating method.

Further the inorganic, reductive color-forming layer 11 comprises a $WO_3$ thin layer having a layer thickness of 6000 Å which is formed on the surface of the ITO lower electrode 10a by the EB evaporation method in which a $WO_3$ tablet is evaporated with an EB gun.

On the other hand, the transparent cover glass 23 also comprises soda-lime glass having a layer thickness of 2 mm as a substrate having formed on the surface thereof an upper electrode 10b composed of an ITO thin layer having a layer thickness of 2000 Å by the ion plating method. Further, an organic, oxidative color-forming layer 12 composed of a green to navy blue polyaniline layer having a layer thickness of 4000 Å is formed on the surface of the upper electrode 10b. The organic, oxidative color-forming layer 12 is obtained by applying a current between both electrodes using as an anode the aforesaid upper electrode 10b immersed in an electrolytic solution obtained by mixing an aqueous solution of 1.0N $HClO_4$ and a 1.0 molar concentration of an aqueous solution of aniline hydrochloride crystalline powders in an equimolar ratio, and a carbon plate as a cathode.

Next, the aforesaid inorganic, reductive color-forming layer 11 and the organic, oxidative color-forming layer 12 are faced to each other and a spacer 14 is provided therebetween. An electrolytic solution 13 composed of a 0.1N $HClO_4$ aqueous solution is poured into the spacer 14, which is then sealed with epoxy resin to prepare an electrolytic solution layer 15. Further lead wires 22a, 22b are connected to both electrodes 10a, 10b described above, as shown in FIG. 5.

When a direct current voltage is applied between both electrodes 10a and 10b described above upon exposure of the sunroof 20 with a dimmer function having the above-described construction to sunlight, the inorganic, reductive color-forming layer 11 in the EC 1 receives a proton at the interface with the electrolytic solution 13 poured and sealed in the spacer 14 and the proton is eliminated at the interface between the electrolytic solution 13 and the organic, oxidative color-forming layer 12, whereby reversible color reactions of both are caused simultaneously and transmittance of incident light into the inside of a car from the outside reversibly varies. It is thus possible to desirably set forth the quantity of incident light into the inside of a car by mounting a switch with a regulartor mechanism to, e.g., an instrument pannel and appropriately adjusting a voltage applied to the EC 1 by operation of the switch. In addition, the EC 1 of this example has a large optical density change ($\Delta O.D.$) and provides high responsibility so that brightness of the inside of a car can be readily changed in a great range.

Further by providing a mechanism that can automatically adjust a voltage to be applied with a photosensor incorporated in a circuit, the driver is released from complicated switching operation described above.

The sunroof 20 with a dimmer function of this example also possesses the following effects.

(1) By coloration of EC, design of an automobile can be elaborated.

(2) Deterioration and color fading of interior articles of a car due to ultraviolet rays can be prevented.

(3) Privacy of large-sized vehicles having a high height can be protected. (Glare-Free Mirror)

Next, the present invention will be described with examples embodied in glare-free mirror.

EXAMPLE 6

The main part of a glare-free mirror 70 comprises transparent glass 71 and EC 2 formed on the surface thereof using this glass 71 as a substrate, as shown in FIG. 8. Lead wires 72a and 72b are connected to both electrodes of the EC 2, respectively, which are connected to battery sources.

Further as shown in FIG. 9, the EC 2 described above comprises, using transparent glass 71 for glare-free mirror as a substrate, laminating in sequence on the surface thereof an ITO lower electrode 10a, an inorganic, reductive color-forming layer 11, an electrolyte layer 17 sealed with epoxy resin 18, an organic, oxidative color-forming layer 12, an ITO upper electrode 10b and a transparent cover glass 73. A thin layer of a metal such as aluminum, etc. is formed on either surface a or surface 6 of the aforesaid transparent cover glass 73 by the vacuum evaporation method or the sputtering method, thereby forming a mirror surface reflecting an incident light from the front.

The EC 2 of this example is composed of the same electrochromic material in the same manner as disclosed in EXAMPLE 4 described above.

Namely, the transparent glass 71 for glare-free mirror is composed of soda-lime glass having a layer thickness of 1 mm and using the same as a substrate, the lower electrode 10a composed of an ITO thin layer having a layer thickness of 2000 Å is formed on the surface thereof. Further, the inorganic, reductive color-forming layer 11 composed of a $WO_3$ thin layer having a layer thickness of 4000 Å is formed on the surface of the ITO thin layer by the EB evaporation method described above.

On the other hand, the transparent cover glass 73 is soda-lime glass having a layer thickness of 1 mm, at the surface b side of which an aluminum thin layer is formed by the vacuum evaporation method.

Furthermore, the upper electrode 10b composed on an ITO thin layer having a layer thickness of 2000 Å is formed on the surface a side of the cover glass 73 used as a substrate, by the ion plating method. On the surface of the upper electrode 10b, the organic, oxidative color-forming layer 12 composed of polypyrrole having a layer thickness of 4000 Å is formed.

Next, a semi-solid melt mixture obtained by heating a mixture of 1 part by weight of cellulose acetate and 5.5 parts by weight of propylene carbonate containing a 1 molar concentration of $LiBF_4$ at 50° to 100° C. was coated onto the surface of the aforesaid $WO_3$ thin layer. Thereafter, the soda-lime glass substrate having laminated thereon the aforesaid polypyrrole coated ITO electrodes was pressed onto the surface of the melt mixture described above, around which was sealed with epoxy resin 18 to prepare the electrolyte layer 17. Further, lead wires 72a and 72b were connected to the aforesaid electrodes 10a and 10b as shown in FIG. 8.

When a direct current voltage is applied between the aforesaid electrodes 10a and 10b upon throwing of a headlight of a vehicle coming from the rear direction in the night, $Li^+$ is doped/undoped at the interface between the inorganic, reductive color-forming layer 11 in the EC 2 and the electrolyte layer 17. Further a doping/undoping reaction of $BF_4-$ anion is caused at the interface between the organic, oxidative color-forming layer 12 and the electrolyte layer 17. By these electrochemical reactions, reversible color-forming reactions generate to reversibly vary transmittance of the EC 2.

In this case, the quantity of a headlight reflected by the mirror surface composed of the aluminum thin layer vacuum deposited on the surface of the aforesaid cover glass 72 also varies reversibly.

It is thus possible to desirably set the quantity of the incident light of the headlight at the aforesaid mirror surface, by mounting a switch with a regulator mechanisms to, e.g., an instrument panel, and appropriately adjusting a voltage to be applied to the EC 2 by operation of the switch. In addition, the EC 2 of this example has an extremely large optical density change ($\Delta O.D.$) and provides high responsibility so that a desired reflectance balanced between the anti-glare effect and the rear visibility can be readily set forth.

Furthermore, the driver can be released from complicated operations of the switch by providing a mechanism for automatically adjusting a voltage to be applied with a photosensor incorporated in a circuit.

The device of the present invention is not limited to the constructions disclosed in EXAMPLES 5 and 6 described above but may also be embodied as follows within a scope without departing from the gist of the present invention.

(1) Other transition metal oxides such as $MoO_3$, $TiO_2$ etc. may be used to form a reductive color-forming layer, in place of $WO_3$. Further, for formation of the reductive color-forming layer, another type of ion plating method, a sputtering method, a vacuum evaporation method, etc. may be adopted.

(2) The oxidative color-forming layer amy also be formed using organic electrochromic materials such as poly-N-alkylpyrroles, polythiophene, poly-3-alkylthiophenes, etc.

(3) In the case of the glare-free mirror, transparent materials such as $TiO_2$, $SnO_2$, etc. or opaque materials such as Au, Ag, Pt, etc. may be used for one of the opposing electrodes.

Further in the case of using Ag or Pt, the aluminum deposition on the surface b side may be omitted.

(4) In case that an electrolyte layer composed of a solid or semi-solid electrochromic materials is adopted as in EXAMPLE 6 described above, polyethylene oxide, polyvinyl acetate, polyvinyl butyral or polyvinylidene fluoride may also be used as the organic high molecular polymer.

Further, a solution of $LiClO_4$, $LiPF_6$, or the like dissolved in a polar organic solvent such as sulforane, acetonitrile, benzonitrile, nitrobenzene, nitromethane, dimethoxyethane, or the like may also be used as the electrolyte.

(5) As materials for the substrate, inorganic glass other than soda-lime glass and heat-resistant plastic materials may also be used.

Further the present invention can also be widely embodied not only in the sunroof of EXAMPLE 5 and the glare-free mirror of EXAMPLE 6 but also as dimmers for automobiles, aircrafts, railway vehicles, windoes of architectures, etc.

(Display Device for Automobile)

Next, the present invention will be described with reference to the example embodied into a display device of an automobile.

EXAMPLE 7

Figures 11, 12, 13:
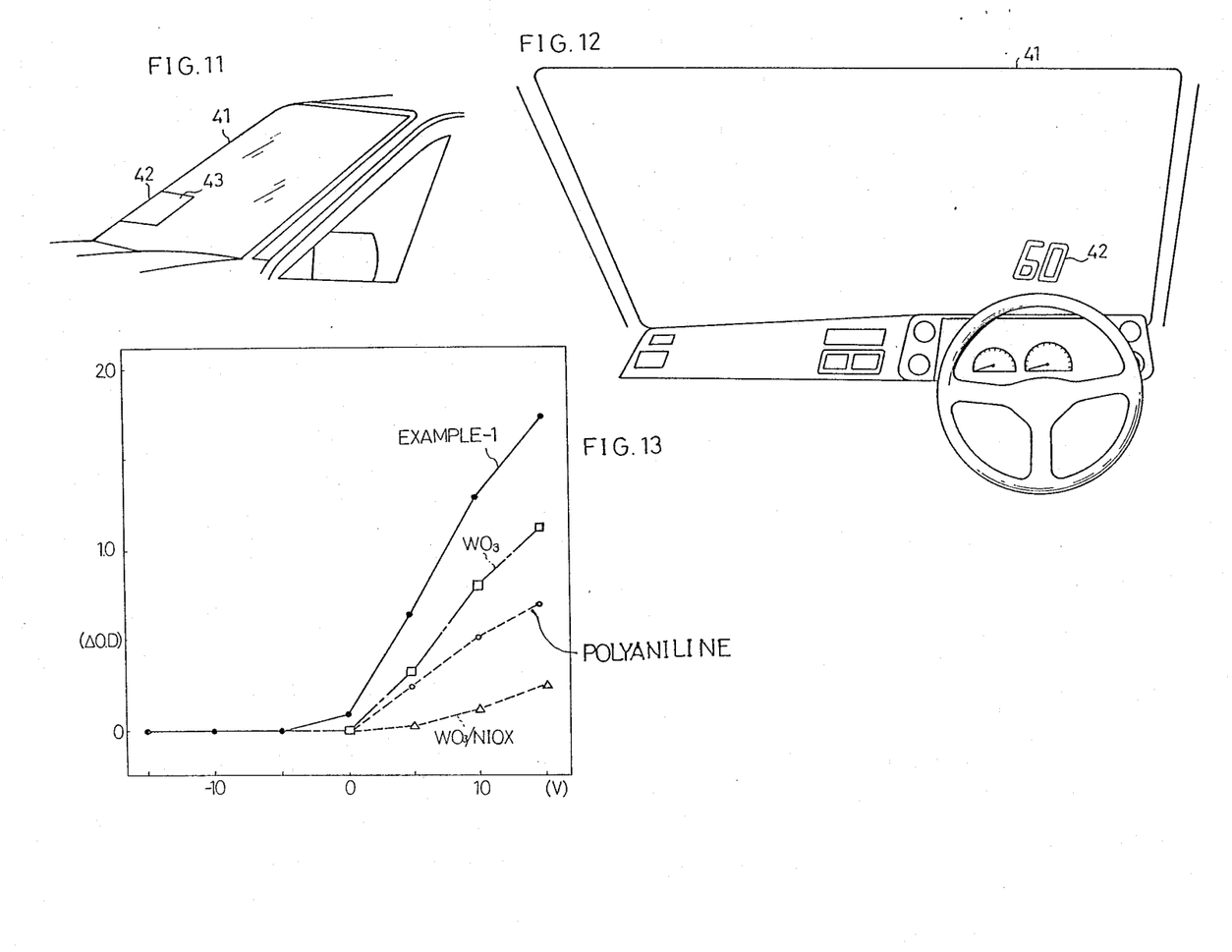
FIG. 11 is a perspective view of a display part mounted to front wind shield and FIG. 12 is a front view showing a state of operation thereof.
FIGS. 13, 15 and 16 are graphs showing change in optical density ($\Delta$O.D.) depending on change in voltage applied and, FIG. 14 is a graph showing $\Delta$O.D. depending on an injected charge ($mC/cm^2$) applied.

The display device of this example is to display various informations such as a speed, an engine speed, etc. by coloring or emitting a light, if necessary, on a display part 42 composed of a transparent thin layer mounted to a front wind shield 41 of an automobile, shown in FIG. 11.

A basic construction of the display device is shown in FIG. 10. Namely, the display part 42 of the display device is a transparent thin layer comprising EC 1 formed on the surface of a substrate composed of a transparent glass 43 having laminated thereon an electroluminescence element 3 (hereafter simply referred to as EL) formed on the surface of the EC 1. The transparent glass 43 is mounted to a part of the front wind shield 41 of an automobile as shown in FIG. 11. Further the display part 42 is connected to battery source through a lead wire and a control circuit not shown in the drawing; when a direct current voltage is applied, EC 1 operates and, EL 3 operates when a high frequency alternate current voltage is applied.

Next, the details of the construction of the display device will be described with reference to the method for production thereof. Firstly, the aforesaid EC 1 is obtained using the same electrochromic material in the same manner as disclosed in EXAMPLE 1 described above.

Namely, the transparent glass 43 used as the substrate is soda-lime glass having a layer thickness of 1 mm and a lower electrode 10a formed on the surface thereof is an ITO thin layer having a layer thickness of 2000 Å obtained by the ion plating method.

And patterns such as numerals, characteris, figures, etc. are formed on the lower electrode 10a. Further an inorganic, reductive color-forming layer 11 formed on the surface of the ITO thin layer is a $WO_3$ thin layer having a layer thickness of 6000 Å obtained by the EB evaporation method. An electrolytic solution layer 15 formed on the surface thereof comprises a spacer 14 composed of silicone resin and an electrolytic solution 13 composed of an aqueous solution of 0.1N $HClO_4$ which is poured in and sealed with the epoxy resin.

Further on the surface thereof, an organic oxidative color-forming layer 12 and an upper electrode 10b are laminated in this order. The upper electrode 10b is an ITO thin layer having a layer thickness of 2000 Å as in the aforesaid lower electrode 10a. Further the organic, oxidative color-forming layer 12 is a green to navy blue polyaniline layer having a layer thickness of 4000 Å formed on the surface of the aforesaid upper electrode 10b using an electrolytic solution obtained by mixing a 1.0 N $HClO_4$ aqueous solution and a 1.0 molar concentration of an aqueous solution of aniline hydrochloride crystalline powders in an equimolar ratio.

On the other hand, the aforesaid EL 3 is composed of the electroluminescence material laminated on the surface of the upper electrode 10b of the EC 1. Namely, an insulating layer 52 composed of $Ta_2O_5$ is formed on each surface of the upper electrode 10b and the opposing electrode 51 and, a light-emitting layer 53 of ZnS containing a trace amount of Mn is formed between the dual insulating layers 52. Further a transparent cover glass 54 is mounted to the other surface of the opposing electrode 51.

The EL 3 is an element in which the light-emitting layer 53 generates emission of a yellow orange light (emission peak wavelength=5850 Å) when a high frequency alternate current voltage is applied between the upper electrode 10b and the opposing electrode 51. The EL 3 is prepared using the radio frequency sputtering method and the EB evaporation method in combination, in an apparatus for radio frequency sputtering.

The display part 42 having the foregoing construction is mounted to a part of the front wind shield 41 via an adhesive applied to the back surface of the substrate. Lead wires connected to a control circuit are mounted to connect each of the electrodes 10a, 10b and 51 of the display part 42.

Thus, when a direct current voltage is applied to the display prt 42 during travelling in daytime, EC 1 operates to cause a reversible color-forming reaction, whereby various informations such as a speed, an engine speed, etc. are displayed on the display part 42 of the front wind shield 41 as shown in FIG. 12. Further the EC 1 has an extremely large optical density change ($\Delta$O.D.) and provides high responsibility so that lightness of the display part 42 can be desirably set forth depending upon lightness of the outdoor by mounting a switch with a regulator mechanism to, e.g., an instrument pannel, and appropriately adjusting a voltage to be applied to the EC 1 by operation of the switch.

Further, by providing a mechanism that can automatically adjust a voltage to be applied by incorporating a photosensor incorporated in a circuit, the driver can be released from complicated operations of the switch.

Further by applying a high frequency alternate current voltage during travelling in the night, the EL 3 emits light thereby to display various informations on the display part 42 of the front wind shield.

And the display part 42 described above is mounted to a part of the front wind shield 41 and therefore, the driver can view various informations without substantially turning his eys on and such is extremely convenient. Further due to transparent nature of the part other than numerals and characters displayed, the driver is not prevented at the front view angle.

The display device of the present invention is not limited to the above example but may also be embodied as follows, without departing from the gist of the present invention.

(1) Other transition metal oxides such as $MoO_3$, $TiO_2$, etc. may be used to form a reductive color-forming layer, in place of $WO_3$. Further, for formation of the reductive color-forming layer, another type of ion plating method, a sputtering method, a vacuum evaporation method, etc. may be adopted.

(2) The oxidative color-forming layer may also be formed using organic electrochromic materials such as poly-N-alkylpyrroles, polythiophene, poly-3-alkylthiophenes, etc.

(3) Other electroluminescent materials may also be used for EL.

(4) As materials for the substrate, inorganic glass other than soda-lime glass and heat-resistance plastic materials may also be used.

(5) The display device may be constructed by changing the location of EC and EL. Further the display part may be constructed only with EC.

Further the present invention can be embodied not only in the display device for an automobile disclosed in EXAMPLE 7 described above but also widely in display devices for aircrafts, railway vehicles or various industrial instruments.

While the present invention has been described in detail and with reference to specific embodiments thereof, it will be apparent to one skilled in the art that various changes and modifications can be made therein without departing from the spirit and scope thereof and therefore, the present invention is not deemed to be limited to the specific embodiments except for limiting in the appended claims.

What is claimed is:

1. An electrochromic element comprising a pair of electrodes, at least one of which is transparent, an organic, oxidative color-forming layer and an inorganic, reductive color-forming layer formed between said pair of electrodes to face to each other, and an electrolytic solution sealed between said both color-forming layers.

2. An electrochromic element as claimed in claim 1 wherein said organic, oxidative color-forming layer is one member selected from the group consisting of polyaniline, polypyrrole, and polythiophene.

3. An electrochromic element as claimed in claim 1 wherein said inorganic, reductive color-forming layer is one member selected from the group consisting of $WO_3$, $MoO_3$ and $TiO_2$ or a mixture thereof.

4. An electrochromic element comprising a pair of electrodes, at least one of which is transparent, an organic, oxidative color-forming layer and an inorganic, reductive color-forming layer formed between said pair of electrodes to face to each other, and a solid or semi-solid electrolyte layer formed between said both color-forming layers.

5. An electrochromic element as claimed in claim 4 wherein said organic, oxidative color-forming layer is one member selected from the group consisting of polyaniline, polypyrrole, and polythiophene.

6. An electrochromic element as claimed in claim 4 wherein said inorganic, reductive color-forming layer is one member selected from the group consisting of $WO_3$, $MoO_3$ and $TiO_2$ or a mixture thereof.

* * * * *